United States Patent [19]
Park et al.

[11] Patent Number: 5,750,452
[45] Date of Patent: May 12, 1998

[54] DIELECTRIC CERAMIC COMPOSITION FOR MICROWAVE

[75] Inventors: Jung-Rae Park; Tae-Hong Kim; Suk-Jin Lee; Tae-Goo Choy, all of Daejeon, Rep. of Korea

[73] Assignees: Korea Telecommunication Authority, Seoul; Electronics And Telecommunications Research Institute, Daejeon, both of Rep. of Korea

[21] Appl. No.: 804,280

[22] Filed: Mar. 3, 1997

Related U.S. Application Data

[63] Continuation of Ser. No. 531,642, Sep. 21, 1995, abandoned.

[30] Foreign Application Priority Data

Sep. 22, 1994 [KR] Rep. of Korea ............ 94-23883
Nov. 16, 1994 [KR] Rep. of Korea ............ 94-30097
Dec. 13, 1994 [KR] Rep. of Korea ............ 94-33907

[51] Int. Cl.$^6$ .................. C04B 35/468; C04B 35/472
[52] U.S. Cl. ................................... 501/138; 501/139
[58] Field of Search .......................... 501/138, 139

[56] References Cited

U.S. PATENT DOCUMENTS

| | | | |
|---|---|---|---|
| 4,330,631 | 5/1982 | Kawashima et al. | 501/139 |
| 4,500,942 | 2/1985 | Wilson . | |
| 4,550,089 | 10/1985 | Ayusawa et al. | 501/39 |
| 4,753,906 | 6/1988 | Nishigaki et al. | 501/39 |
| 5,077,247 | 12/1991 | Sato et al. | 501/139 |
| 5,256,639 | 10/1993 | Fujimaru et al. | 501/139 |
| 5,350,721 | 9/1994 | Abe et al. | 501/139 |
| 5,432,136 | 7/1995 | Shibata et al. | 501/138 |

OTHER PUBLICATIONS

Kolar, et al.: "Ceramic and dielectric properties of selected compositions in the BaO–TiO$_2$–Nd$_2$O$_3$ system"; Nov. 17&18, 1977; pp. 346–348; Ber. Dt. Keram. Ges. 55 (1978)Nr.7.

Durand,et al: "Microwave characteristics of BaO–Bi$_2$O$_3$–TiO$_2$Nd$_2$O$_3$ dielectric resonators"; pp. 134–136; Journal of Materials Science Letters 6 (1987).

Mercurio, et al: "Microwave dielectric properties of BaND$_{2(1-x)}$SM$_{2x}$Ti$_5$O$_{14}$ ceramics"; pp. 112–114; Materials Letters, vol. 8, No. 3,4 May 1989.

Kolar, et al: "High stability, low loss dielectrics in the system. . . "; pp. 269–272; Ferroelectrics, 1980, vol. 27.

Wakino, et al.: "Microwave characteristics of (Zr, Sn)TiO$_4$ and BaO–PbO–Nd$_2$O$_3$–TiO$_2$ dielectric resonators"; pp. 278–281; Journal of the American Ceramic Society, vol. 67, No. 4; Apr. 1984.

Nishigaki, et al.: "Microwave dielectric properties of (Ba, Sr)O–Sm$_2$O$_3$TiO$_2$–ceramics"; pp. 1405–1410; Ceramic Bulletin, vol. 66, No. 9, 1987.

Kato, et al.: "Dielectric properties of lead alkaline—earth zirconate at microwave frequencies"; pp. 2343–2346; Japanese Journal of Applied, vol. 30, No. 9B, Sep. 1991.

*Primary Examiner*—Karl Group
*Attorney, Agent, or Firm*—Jacobson, Price, Holman & Stern, PLLC

[57] ABSTRACT

The present invention relates to a dielectric ceramic composition for microwave which consists of BaO, Sm$_2$O$_3$, TiO$_2$ and PbO, and has a compositional formula of x(Ba$_{1-\alpha}$Pb$_\alpha$)O—ySm$_2$O$_3$–zTiO$_2$, wherein 6 mol % $\leq$x$\leq$20 mol %, 6 mol %$\leq$y$\leq$20 mol %, 60 mol % $\leq$z$\leq$75 mol % and 0 mol % $\leq\alpha\leq$0.2 mol %. Accordingly, since the dielectric ceramic composition for microwave according to the present invention has the dielectric constant more than 85, the temperature factor of the resonant frequency within ±5 ppm/°C., and the quality factor more than 6000 in 1 GHz, it can be utilized in the filter for microwave, the dielectric for the resonator, the laminated ceramic capacitor, the dielectric for the filter for electromagnetic wave obstacle and the dielectric for capacitor. And also, since it is possible to reduce the problems to the volatilization of the plumbic oxide and the bismuth oxide, the dielectric ceramic composition for microwave according to the present invention can be made by a general manufacturing process and can reduce the use of the elements detrimental to the human body.

10 Claims, No Drawings

DIELECTRIC CERAMIC COMPOSITION FOR MICROWAVE

This application is a continuation of application Ser. No. 08/531,642 filed Sep. 21, 1995 now abandoned.

BACKGROUND OF THE INVENTION

The present invention relates to a dielectric ceramic composition for microwave frequency, and more particularly to a dielectric ceramic composition having a high dielectric constant, a low temperature coefficient of the resonant frequency and a high quality factor(Q) for microwave frequency.

Recently, as radio communication means such as a carphone, a portable telephone, a radio telephone, a satellite broadcasting receiver, etc. are used widely, microwave dielectric ceramics are also used widely for microwave components such as band-pass filters, substrates and voltage controlled oscillators(VCOs), etc with development of microwave integrated circuits.

The basic materials for microwave components should have the high dielectric constant, the quality factor should be high more than 5000, and the temperature coefficient of the resonant frequency should be low to the extent of ±5 ppm/°C. at microwave frequency. Therefore, microwave components using resonators, generally, are formed of the dielectric ceramics having the high dielectric constant such as $BaO-Nd_2O_3-TiO_2$ system, $BaO-Sm_2O_3-TiO_2$ system, etc.

The dielectric constant($\epsilon$) of dielectric ceramics such as $BaO-Nd_2O_3-TiO_2$ system, $BaO-SM_2O_3-TiO_2$ system, etc. is within the extent of 60 to 80 and the quality factor(Q) is high to the extent of 5000 in 1 GHz, but the temperature coefficient of the resonant frequency($r_f$) is high to ±30 ppm/°C. Accordingly, these dielectric ceramics had many problems for pratical materials at microwave frequency.

$PbO-ZrO_2-CaO$ system having the high dielectric constant is shown in JAPANESE JOURNAL OF APPLIED PHYSICS, VOL. 30, NO. 9B, pp. 2343–2346(1991.11) by Junichi Kato, et al. The dielectric constant of $PbO-ZrO_2-CaO$ system is high more than 90 but its quality factor is low to the extent of 1000 to 3500, and its loss factor is high at high frequency more than 3 GHz, and therefore it has a defect that a loss of microwave components such as band pass filters(BPFs) and a voltage controlled oscillators (VCOs) become raised.

A composition of $BaO-PbO-Nd_2O_3-TiO_2$ system is shown in JOURNAL OF AMERICA CERAMIC SOCIETY, VOL. 67, NO. 4, pp. 278–281 by Wakino et al. Said composition of $BaO-PbO-Nd_2O_3-TiO_2$ system adds PbO to the composition of $BaO-Nd_2O_3-TiO_2$ system and it has a composition ratio of $0.5BaO-0.5PbO-1.0Nd_2O_3-5.0TiO_2$. Said composition of $BaO-PbO-Nd_2O_3-TiO_2$ system is its dielectric constant raised to the extent of 85–90 by said PbO and its quality factor also is high to the extent of 4000–5000.

But, while the composition ratio of PbO of the composition of the $BaO-PbO-Nd_2O_3-TiO_2$ system is very high, the PbO is very volatile strong and an amount being volatilized becomes much in proportion to a quantity of PbO. Accordingly, there is a problem that not only the components produced by composition is difficult to have a uniform composition ratio, but also they can exert a fatal influence upon the human body in the manufacturing process.

SUMMARY OF THE INVENTION

Accordingly, an object of the present invention is to provide the dielectric ceramic composition for microwave frequency in which the dielectric constant and the quality factor in the high frequency wave are high and the temperature coefficient of the resonant frequency is low so that the components for microwave can be produced.

A further object of the invention is to provide the dielectric ceramic composition for microwave components which allows the composition ratio of PbO to be small and the volatilized quantity of Pb harmful to the human body to be small and thereby allows the elements having the uniform composition ratio to be produced.

A dielectric ceramic composition for microwave components according to an embodiment of the present invention for achieving the said objects consists of BaO, $Sm_2O_3$, $TiO_2$ and PbO or a compound of them, and has a compositional formula of $x[(BaO)_{1-\alpha}(PbO)_\alpha]-ySm_2O_3-zTiO_2$, wherein 6 mol %$\leq$x$\leq$20 mol %, 6 mol %$\leq$y$\leq$20 mol %, 60 mol %$\leq$z$\leq$75 mol % and 0 mol %$\leq\alpha\leq$0.2 mol %.

A dielectric ceramic composition for microwave frequency according to a further embodiment of the present invention for achieving said objects includes BaO, $Sm_2O_3$, $TiO_2$ and PbO as chief ingredients and further includes SrO, $ZrO_2$, $MnO_2$, MgO, ZnO, $Bi_2O_3$, $La_2O_3$, $CeO_2$, etc. or the compound of them as additives to selectively add one or more of said additives into said chief ingredients, and thereby provides a compositional formula of $x[(BaO)_{1-\alpha-\beta}(PbO)_\alpha(MO)_\beta]-y[(Sm_2O_3)_{1-\gamma-\delta}(La_2O_3)_\gamma(CeO_2)_\delta]-zTiO_2$, wherein $(MO)_\beta$ is $ZrO_2$, $MnO_2$, MgO, ZnO or $Bi_2O_3$, 6 mol %$\leq$x$\leq$20 mol %, 6 mol %$\leq$y$\leq$20 mol %, 60 mol %$\leq$z$\leq$75 mol %, 0 mol %$\leq\alpha\leq$0.2 mol %, 0 mol %$\leq\beta\leq$0.3 mol %, 0 mol %$\leq\gamma\leq$0.3 mol %, 0 mol %$\leq\delta\leq$0.3 mol %, and x+y+z=100 mol %.

Other objects, features and advantages of the present invention will be apparent from the following description.

DETAILED DESCRIPTION OF THE PREFERRED EMBODIMENTS

The present invention consists of BaO, $Sm_2O_3$, $TiO_2$ and PbO, or the present invention includes BaO, $Sm_2O_3$, $TiO_2$ and PbO as the chief ingredients and selectively adds one or more of the accessory ingredients of SrO, $ZrO_2$, $MnO_2$, MgO, ZnO, $Bi_2O_3$, $La_2O_3$, $CeO_2$, etc. into said chief ingredients, and thereby provides the dielectric ceramic composition for microwave which can manufacture the elements for microwave in which the dielectric constant and the quality factor in the high frequency wave are high and the temperature faction of the resonant frequency is low.

BaO, $Sm_2O_3$, $TiO_2$ and PbO are weighed as shown in the below Table 1 and are mixed with a deionized water. This mixing is achieved by a use of a ball milling method which puts the powdered BaO, $SM_2O_3$, $TiO_2$ and PbO and the deionized water in a plastic jar and mixes a zirconia ball. The said mixed powder has the compositional formula of $x[(BaO)_{1-\alpha}(PbO)_\alpha]-ySm_2O_3-zTiO_2$, wherein 6 mol %$\leq$x$\leq$20 mol %, 6 mol %$\leq$y$\leq$20 mol %, 60 mol %$\leq$z$\leq$75 mol %, 0 mol %$\leq\alpha\leq$0.2 mol %, and x+y+z=100 mol %. And after drying the powder, the dried powder is calcined under a high temperature of 1000° C. or more and thereby is formed of a crystal structure. And a polyvinyl alcohol is added to the dried powder in appropriate quantity and is mixed within a zirconia mortar.

Then, said mixed materials are molded into a cylindrical test sample having a diameter of 10 mm or more and a height of 5 mm or more by a metal mold and an oil pressure press, and the test piece is put onto a zirconia setter and is sintered in an electric furnace. Said forming is performed under a pressure of 1.0 ton/cm² or more, and said sintering is performed for 2 to 5 hours in a high temperature of 1200° to 1400° C. under atmosphere.

<Table 1> was obtained by measuring the dielectric constant and the quality factor of the test sample produced by the above mentioned method and by calculating the temperature coefficient of the resonant frequency. In the above, the dielectric constant was measured to be 78.1 to 93.2 under the high frequency of 3 GHz by Hakki-Coleman method, and the quality factor was measured to be 3906 to 7107 under 1 GHz in no-load of said test sample by an open resonance techniques. And, the temperature factor of the resonant frequency($r_f$) was obtained from the following formula:

$$r_f = \frac{f(125) - f(25)}{f(25)} \times \frac{1}{\Delta T} \quad (\text{ppm}/°C.)$$

This formula is on the basis of the resonant frequency to the temperature of 25° C. and the temperature range is 25° C. to 125° C., and the result is about −15.1 to +14.6 ppm/°C. In said formula, f(125) is the resonant frequency at 125° C., f(25) is the resonant frequency at 25° C., and f(25) and f(125) have some difference in accordance with each of the test sample around 3 GHz. And ΔT is a difference of the measuring temperature and in the case of said formula, it is 125° C.−25° C.=100° C.

<Table 1> shows the composition of $x[(BaO)_{1-\alpha}(PbO)_\alpha]$ $-ySm_2O_3-zTiO_2$, and the dielectric constant, the quality factor and the temperature coefficient of the resonant frequency according to the sintering condition.

<Table 2> and <Table 3> include BaO, $Sm_2O_3$, $TiO_2$ and PbO as the chief ingredients and add SrO and ZrO as the accessory ingredients instead of a small quantity of BaO, and thereby show the dielectric constant, the quality factor and the temperature coefficient of the resonant frequency of the dielectric ceramic composition having the compositions of $x[(BaO)_{1-\alpha-\beta}(PbO)_\alpha(SrO)_\beta]-y(Sm_2O_3)-zTiO_2$ and $x[(BaO)_{1-\alpha-\beta}(PbO)_\alpha(ZrO_2)_\beta]-y(SM_2O_3)-zTiO_2$. In the above, the dielectric constant and the quality factor are increased and the temperature coefficient of the resonant frequency is shifted to positive direction by adding SrO and $ZrO_2$ as the additives instead of a small quantity of BaO.

<Table 4> includes BaO, $Sm_2O_3$, $TiO_2$ and PbO as the main ingredients and adds $MnO_2$ as the additives instead of a small quantity of BaO, and thereby shows the dielectric constant, the quality factor and the temperature coefficient of the resonant frequency of the dielectric ceramic composition having the composition of $x[(BaO)_{1-\alpha-\beta}(PbO)_\alpha(MnO_2)_\beta]$ $-y(Sm_2O_3)-zTiO_2$. In the above, the dielectric constant and the quality factor are increased and the sintered characteristic nature is improved by adding $MnO_2$ as the additives instead of a small quantity of BaO, and thereby the proper sintering temperature of said dielectric ceramic composition is 1200° C. to 1300° C., which is lower than the sintering temperature of the composition consisting of only the main ingredients of the said BaO, $Sm_2O_3$, $TiO_2$ and PbO.

<Table 5> and <Table 6> include BaO, $Sm_2O_3$, $TiO_2$ and PbO as the chief ingredients and add MgO and ZnO as the accessory ingredients instead of a small quantity of BaO, and thereby show the dielectric constant, the quality factor and the temperature coefficient of the resonant frequency of the dielectric ceramic composition having the compositions of $x[(BaO)_{1-\alpha-\beta}(PbO)_\alpha(MgO)_\beta]-y(SM_2O_3)-zTiO_2$ and $x[(BaO)_{1-\alpha-\beta}(PbO)_\alpha(ZnO)_\beta]-y(Sm_2O_3)-zTiO_2$. In the above, the dielecrtic constant and the quality factor are much the same and the sintered characteristic nature is improved by adding MnO and ZnO as the accessory ingredients instead of a small quantity of BaO, and thereby the proper sintering temperature of said dielectric ceramic composition is 1200° C. to 1300° C., which is lower than the sintering temperature of the composition consisting of only the chief ingredients of the said BaO, $SM_2O_3$, $TiO_2$ and PbO.

<Table 7> includes BaO, $Sm_2O_3$, $TiO_2$ and PbO as the chief ingredients and adds $Bi_2O_3$ as the additives ingredient instead of a small quantity of BaO, and thereby shows the dielectric constant, the quality factor and the temperature factor of the resonant frequency of the dielectric ceramic composition having the compositions of $x[(BaO)_{1-\alpha-\beta}(PbO)_\alpha(Bi_2O_3)_\beta]-y(Sm_2O_3)-zTiO_2$. In the above, the sintered characteristics is improved by adding $Bi_2O_3$ as the accessory ingredient instead of a small quantity of BaO, and thereby the proper sintering temperature of the said dielectric ceramic composition is 1200° C. to 1300° C., which is lower than the sintering temperature of the composition consisting of only the chief ingredients of said BaO, $Sm_2O_3$, $TiO_2$ and PbO, but there is a difficulty in adjusting the composition due to the volatilization if $Bi_2O_3$ is added more than 20 mol %.

In the compositions shown in <Table 1> to <Table 7>, the quality factor is increased as the content of $Sm_2O_3$ is increased, but in this case the proper sintering temperature rises more than 1400° C., and also if the content of $Sm_2O_3$ is more than 18 mol %, the temperature factor of the resonant frequency is shifted to positive direction to plus(+). And if the content of $Sm_2O_3$ is less than 5 mol %, the content of $TiO_2$ is increased relatively and the temperature coefficient of the resonant frequency is shifted to plus(+).

Also, in the compositional formulas of the compositions shown in <Table 2> to <Table 7>, x is 6 mol %≦x≦20 mol %, y is 6 mol %≦y≦20 mol %, z is 60 mol %≦z≦75 mol %, α is 0 mol %≦α≦0.2 mol %, β is 0 mol %≦β≦0.3 mol % and x+y+z=100 mol %.

<Table 8>, <Table 9> and <Table 10> include BaO, $Sm_2O_3$, $TiO_2$ and PbO as the main ingredients and add $La_2O_3$ and CeO of the rare-earth elements respectively instead of a small quantity of $Sm_2O_3$ of the rare-earth element, or add $La_2O_3$ and $CeO_2$ together as the additives, and thereby show the dielectric constant, the quality factor and the temperature coefficient of the resonant frequency of the dielectric ceramic composition having the composition of $x[(BaO)_{1-\alpha}(PbO)_\alpha]-y[(SM_2O_3)_{1-\gamma}(La_2O_3)_\gamma]-zTiO_2$, $x[(BaO)_{1-\alpha}(PbO)_\alpha]-y[(Sm_2O_3)_{1-\delta}(CeO_2)_\delta]-zTiO_2$ and $x[(BaO)_{1-\alpha}(PbO)_\alpha]-y[(Sm_2O_3)_{1-\gamma-\delta}(La_2O_3)_\gamma(CeO_2)_\delta]-zTiO_2$. In the above, the dielectric constant and the quality factor can be improved greatly and the temperature factor of the resonant frequency can be stabilized by adding $La_2O_3$ and $CeO_2$ respectively instead of a small quantity of $Sm_2O_3$, or by adding $La_2O_3$ and $CeO_2$ together as the additives.

In particular, if $La_2O_3$ is added instead of BaO, the quality factor is increased but the temperature coefficient of the resonant frequency is shifted to plus(+). In the compositional formulas of the compositions of said <Table 8> to <Table 10>, the ranges of x, y, z, α, β, γ and δ are as follows: 6 mol %≦x≦20 mol %, 6 mol %≦y≦20 mol %, 60 mol %≦z≦75 mol %, 0 mol %≦α≦0.2 mol %, 0 mol %≦β≦0.3 mol %, 0 mol %≦γ≦0.3 mol %, 0 mol %≦δ≦0.3 mol % and x+y+z=100 mol %.

As shown in said <Table 1> to <Table 10>, if sintering the compositions within the sintering temperature of the range of 1200° C. to 1400° C., the dielectric ratio more than 85 and the temperature factor of the resonant frequency within ±5 ppm/°C. can be obtained, and the quality factor more than 6000 can obtained in the resonant frequency of 1 GHz.

Also, in the compositions shown in the said <Table 1> to <Table 10>, if increasing the content of BaO, the quality factor is lowered but the temperature coefficient of the resonant frequency is increased. And if increasing the content of $TiO_2$ in the said compositions, the optimum sintering temperature is decreased and the quality factor is increased. But, if the content of $TiO_2$ is more than 75 mol %, the temperature coefficient of the resonant frequency is moved to plus(+), and if the content of $TiO_2$ is less than 60 mol %, the chemical composition ratio is not appropriate and therefore the dielectric characteristic is not appeared. And also, the proper sintering temperature is lowered and the dielectric constant is increased according to the increase of content of PbO, but if the content of PbO is more than 15 mol %, it is difficult to adjust its composition ratio accurately due to the volatilization of PbO, and also the quality factor is lowered. Therefore, it is possible not only to prevent the quality factor from lowering due to the volatilization of the ingredients and it is easy but also to adjust the composition by using PbO of 2 to 4 mol %.

In the compositions of said <Table 1> to <Table 10>, it is possible to use $BaCO_3$ instead of BaO and to use $Pb_3O_4$ instead of PbO. In the above, $BaCO_3$ does not have the dielectric characteristic change greatly although the ingredient of carbon is volatilized therein, and $Pb_3O_4$ has each of the compositions mix uniformly and it does not have the dielectric characteristic change greatly. And, it is possible not only to prevent the quality factor from lowering due to the volatilization of the ingredients, and it is easy but also to adjust the composition by using plumbic oxide and bismuth oxide of about 3 mol % or so.

If the sintering temperature is raised in the equal composition, thereby the dielectric constant and the quality factor are somewhat raised, and if the sintering time is lengthened, the dielectric constant does not change nearly but the quality factor is somewhat raised.

Accordingly, since the dielectric ceramic composition for microwave components according to the present invention has the dielectric constant more than 85 under the room temperature, the temperature coefficient of the resonant frequency within ±5 ppm/°C., and the quality factor more than 6000 in 1 GHz, it can be utilized in the filter at microwave frequency, the dielectric ceramics for the resonator, the laminated ceramic capacitor, the dielectric for the filter for electromagnetic interference. And, since it is possible to reduce the problems to the volatilization of the plumbic oxide and the bismuth oxide, the dielectric ceramic composition for microwave components according to the present invention can be made by a general manufacturing process and can reduce the use of the elements detrimental to the human body.

TABLE 1

| Sample No. | Chief ingredient (mol %) | | | | Sintering condition | | Dielectric ratio | Quality factor | $\tau_f$ |
|---|---|---|---|---|---|---|---|---|---|
| | x | α | y | z | °C. | (h) | (ε) | Q × f | (ppm/°C.) |
| 1 | 16.9 | 0.02 | 15.9 | 68.2 | 1375 | 2 | 80.9 | 5383 | +12.1 |
| 2 | 17.5 | 0.03 | 20.0 | 62.5 | 1400 | 2 | 80.5 | 4813 | −14.7 |
| 3 | 19.1 | 0.03 | 18.4 | 62.5 | 1350 | 2 | 80.9 | 6324 | +13.6 |
| 4 | 16.9 | 0.04 | 15.2 | 69.7 | 1350 | 2 | 79.9 | 5144 | +14.2 |
| 5 | 19.6 | 0.05 | 19.4 | 61.0 | 1400 | 2 | 81.3 | 5121 | −15.1 |
| 6 | 16.6 | 0.06 | 16.7 | 66.7 | 1300 | 2 | 78.1 | 4545 | −12.7 |
| 7 | 8.1 | 0.07 | 17.6 | 74.3 | 1250 | 2 | 82.1 | 5116 | +8.9 |
| 8 | 14.3 | 0.08 | 14.3 | 71.4 | 1225 | 2 | 80.1 | 6232 | +14.1 |
| 9 | 19.4 | 0.09 | 6.8 | 73.8 | 1300 | 2 | 87.5 | 5302 | +11.4 |
| 10 | 19.4 | 0.09 | 6.8 | 73.8 | 1300 | 5 | 87.5 | 5310 | +10.9 |
| 11 | 16.6 | 0.1 | 16.7 | 66.7 | 1300 | 2 | 84.8 | 7042 | −14.5 |
| 12 | 16.6 | 0.1 | 16.7 | 66.7 | 1350 | 2 | 88.3 | 7095 | −4.5 |
| 13 | 16.6 | 0.1 | 16.7 | 66.7 | 1375 | 2 | 88.8 | 7107 | −14.0 |
| 14 | 8.3 | 0.12 | 16.7 | 75.0 | 1225 | 2 | 85.1 | 5600 | +4.9 |
| 15 | 16.6 | 0.12 | 16.7 | 66.7 | 1350 | 2 | 87.8 | 4654 | −7.9 |
| 16 | 6.5 | 0.14 | 19.8 | 73.7 | 1225 | 2 | 92.1 | 3906 | +5.7 |
| 17 | 16.6 | 0.14 | 16.7 | 66.7 | 1275 | 2 | 84.8 | 4763 | −7.7 |
| 18 | 16.6 | 0.15 | 16.7 | 66.7 | 1350 | 2 | 89.9 | 4901 | −11.6 |
| 19 | 12.0 | 0.16 | 16.7 | 71.3 | 1250 | 2 | 88.8 | 4105 | +14.6 |
| 20 | 16.6 | 0.16 | 10.7 | 72.7 | 1300 | 2 | 89.8 | 6275 | +5.4 |
| 21 | 11.6 | 0.18 | 16.7 | 71.7 | 1250 | 2 | 90.8 | 4904 | +12.4 |
| 22 | 10.9 | 0.2 | 18.4 | 70.7 | 1275 | 4 | 93.2 | 4760 | +13.6 |

$x + y + z = 100$

TABLE 2

| Sample No. | Chief ingredient (mol %) | | | | | Sintering condition | | Dielectric ratio | Quality factor | $\tau_f$ |
|---|---|---|---|---|---|---|---|---|---|---|
| | x | y | z | α | β | °C. | (h) | (ε) | Q × f | (ppm/°C.) |
| 1 | 16.9 | 15.9 | 68.2 | 0.03 | 0.25 | 1325 | 3 | 82.1 | 6823 | +14.1 |
| 2 | 19.6 | 19.4 | 61.0 | 0.05 | 0.18 | 1400 | 2 | 81.1 | 6430 | −4.6 |

TABLE 2-continued

| Sample No. | Chief ingredient (mol %) | | | | | Sintering condition | | Dielectric ratio (ε) | Quality factor Q × f | τ_f (ppm/°C.) |
|---|---|---|---|---|---|---|---|---|---|---|
| | x | y | z | α | β | °C. | Hour (h) | | | |
| 3 | 8.1 | 17.6 | 74.3 | 0.08 | 0.07 | 1250 | 5 | 83.3 | 5920 | +10.3 |
| 4 | 19.4 | 6.8 | 73.8 | 0.09 | 0.05 | 1275 | 4 | 88.5 | 5804 | +12.3 |
| 5 | 16.6 | 16.7 | 66.7 | 0.1 | 0.1 | 1325 | 2 | 86.4 | 6225 | −3.3 |
| 6 | 16.6 | 16.7 | 66.7 | 0.12 | 0.3 | 1400 | 2 | 87.6 | 7213 | −1.5 |
| 7 | 6.5 | 19.8 | 73.7 | 0.14 | 0.14 | 1275 | 4 | 92.2 | 6805 | +7.6 |
| 8 | 16.6 | 16.7 | 66.7 | 0.15 | 0.22 | 1350 | 2 | 90.3 | 6920 | +4.5 |
| 9 | 16.6 | 10.7 | 72.7 | 0.17 | 0.27 | 1300 | 3 | 90.7 | 6780 | +9.5 |
| 10 | 16.6 | 16.7 | 66.7 | 0.2 | 0.08 | 1375 | 2 | 91.5 | 5609 | +1.8 |

(x + y + z = 100)

TABLE 3

| Sample No. | Chief ingredient (mol %) | | | | | Sintering condition | | Dielectric ratio (ε) | Quality factor Q × f | τ_f (ppm/°C.) |
|---|---|---|---|---|---|---|---|---|---|---|
| | x | y | z | α | β | °C. | Hour (h) | | | |
| 1 | 16.9 | 15.9 | 68.2 | 0.01 | 0.21 | 1325 | 4 | 80.2 | 7343 | +12.9 |
| 2 | 19.6 | 19.4 | 61.0 | 0.04 | 0.17 | 1425 | 2 | 82.1 | 6950 | −5.1 |
| 3 | 8.1 | 17.6 | 74.3 | 0.07 | 0.06 | 1275 | 3 | 84.4 | 5765 | +8.5 |
| 4 | 19.4 | 6.8 | 73.8 | 0.09 | 0.03 | 1300 | 3 | 89.7 | 5682 | +10.2 |
| 5 | 16.6 | 16.7 | 66.7 | 0.1 | 0.1 | 1350 | 2 | 85.4 | 6445 | −4.5 |
| 6 | 16.6 | 16.7 | 66.7 | 0.1 | 0.13 | 1375 | 2 | 89.3 | 6819 | −2.8 |
| 7 | 6.5 | 16.7 | 66.7 | 0.13 | 0.17 | 1325 | 4 | 89.4 | 6927 | −2.5 |
| 8 | 16.6 | 19.7 | 73.7 | 0.14 | 0.15 | 1250 | 5 | 91.4 | 6135 | +6.6 |
| 9 | 16.6 | 16.7 | 66.7 | 0.15 | 0.25 | 1350 | 2 | 90.2 | 6915 | +7.2 |
| 10 | 16.6 | 10.7 | 72.7 | 0.2 | 0.3 | 1275 | 3 | 89.1 | 7480 | +5.1 |

(x + y + z = 100)

TABLE 4

| Sample No. | Chief ingredient (mol %) | | | | | Sintering condition | | Dielectric ratio (ε) | Quality factor Q × f | τ_f (ppm/°C.) |
|---|---|---|---|---|---|---|---|---|---|---|
| | x | y | z | α | β | °C. | Hour (h) | | | |
| 1 | 16.9 | 15.9 | 68.2 | 0.02 | 0.24 | 1250 | 3 | 81.2 | 5523 | +8.3 |
| 2 | 19.6 | 19.4 | 61.0 | 0.05 | 0.16 | 1250 | 3 | 82.3 | 5804 | −14.6 |
| 3 | 8.1 | 17.6 | 74.3 | 0.07 | 0.05 | 1275 | 3 | 83.5 | 5400 | +4.3 |
| 4 | 19.4 | 6.8 | 73.8 | 0.09 | 0.03 | 1300 | 2 | 88.3 | 5743 | +6.5 |
| 5 | 16.6 | 16.7 | 66.7 | 0.1 | 0.1 | 1275 | 2 | 85.3 | 7125 | −8.3 |
| 6 | 16.6 | 16.7 | 66.7 | 0.1 | 0.15 | 1225 | 4 | 87.8 | 7209 | −5.1 |
| 7 | 16.6 | 16.7 | 66.7 | 0.13 | 0.2 | 1250 | 3 | 87.2 | 6214 | −4.5 |
| 8 | 6.5 | 19.8 | 73.7 | 0.14 | 0.14 | 1225 | 4 | 91.5 | 5207 | +2.6 |
| 9 | 16.6 | 16.7 | 66.7 | 0.15 | 0.3 | 1200 | 5 | 88.4 | 5325 | −8.5 |
| 10 | 16.6 | 10.7 | 72.7 | 0.16 | 0.27 | 1225 | 5 | 88.6 | 6582 | +1.5 |

(x + y + z = 100)

TABLE 5

| Sample No. | Chief ingredient (mol %) | | | | | Sintering condition | | Dielectric ratio ($\epsilon$) | Quality factor $Q \times f$ | $\tau_f$ (ppm/°C.) |
|---|---|---|---|---|---|---|---|---|---|---|
| | x | y | z | $\alpha$ | $\beta$ | °C. | Hour (h) | | | |
| 1 | 16.9 | 15.9 | 68.2 | 0.02 | 0.22 | 1225 | 5 | 82.1 | 5461 | +7.3 |
| 2 | 19.6 | 19.4 | 61.0 | 0.05 | 0.16 | 1250 | 3 | 81.8 | 5934 | −13.4 |
| 3 | 8.1 | 17.6 | 74.3 | 0.07 | 0.03 | 1275 | 2 | 82.7 | 5617 | +5.3 |
| 4 | 19.4 | 6.8 | 73.8 | 0.09 | 0.05 | 1300 | 2 | 87.2 | 5821 | +5.7 |
| 5 | 16.6 | 16.7 | 66.7 | 0.1 | 0.1 | 1250 | 3 | 83.8 | 7053 | −8.6 |
| 6 | 16.6 | 16.7 | 66.7 | 0.1 | 0.13 | 1225 | 4 | 86.3 | 7113 | −4.7 |
| 7 | 16.6 | 16.7 | 66.7 | 0.13 | 0.24 | 1200 | 4 | 85.5 | 6784 | −3.2 |
| 8 | 6.5 | 19.8 | 73.7 | 0.14 | 0.12 | 1250 | 3 | 90.2 | 5758 | +3.6 |
| 9 | 16.6 | 16.7 | 66.7 | 0.15 | 0.3 | 1200 | 5 | 86.6 | 5675 | −7.5 |
| 10 | 16.6 | 10.7 | 72.7 | 0.16 | 0.27 | 1200 | 5 | 86.9 | 6872 | +2.5 |

(x + y + z = 100)

TABLE 6

| Sample No. | Chief ingredient (mol %) | | | | | Sintering condition | | Dielectric ratio ($\epsilon$) | Quality factor $Q \times f$ | $\tau_f$ (ppm/°C.) |
|---|---|---|---|---|---|---|---|---|---|---|
| | x | y | z | $\alpha$ | $\beta$ | °C. | Hour (h) | | | |
| 1 | 16.9 | 15.9 | 68.2 | 0.02 | 0.20 | 1250 | 4 | 83.2 | 5600 | +7.1 |
| 2 | 19.6 | 19.4 | 61.0 | 0.05 | 0.15 | 1275 | 2 | 82.5 | 5877 | −13.8 |
| 3 | 8.1 | 17.6 | 74.3 | 0.07 | 0.05 | 1275 | 3 | 83.2 | 5567 | +4.9 |
| 4 | 19.4 | 6.8 | 73.8 | 0.09 | 0.03 | 1300 | 2 | 86.9 | 6003 | +6.1 |
| 5 | 16.6 | 16.7 | 66.7 | 0.1 | 0.1 | 1250 | 3 | 84.6 | 7089 | −7.2 |
| 6 | 16.6 | 16.7 | 66.7 | 0.1 | 0.12 | 1225 | 4 | 86.9 | 7117 | −4.8 |
| 7 | 16.6 | 16.7 | 66.7 | 0.12 | 0.25 | 1200 | 5 | 86.1 | 6351 | −4.2 |
| 8 | 6.5 | 19.8 | 73.7 | 0.14 | 0.14 | 1250 | 3 | 89.4 | 5567 | +4.5 |
| 9 | 16.6 | 16.7 | 66.7 | 0.15 | 0.3 | 1200 | 5 | 87.3 | 5515 | −83. |
| 10 | 16.6 | 10.7 | 72.7 | 0.16 | 0.28 | 1225 | 4 | 89.6 | 6213 | +2.5 |

(x + y + z = 100)

TABLE 7

| Sample No. | Chief ingredient (mol %) | | | | | Sintering condition | | Dielectric ratio ($\epsilon$) | Quality factor $Q \times f$ | $\tau_f$ (ppm/°C.) |
|---|---|---|---|---|---|---|---|---|---|---|
| | x | y | z | $\alpha$ | $\beta$ | °C. | Hour (h) | | | |
| 1 | 16.9 | 15.9 | 68.2 | 0.02 | 0.23 | 1225 | 5 | 80.2 | 5578 | +8.6 |
| 2 | 19.6 | 19.4 | 61.0 | 0.05 | 0.13 | 1250 | 4 | 80.1 | 5677 | −12.1 |
| 3 | 8.1 | 17.6 | 74.3 | 0.07 | 0.04 | 1275 | 2 | 83.1 | 5411 | +4.5 |
| 4 | 19.4 | 6.8 | 73.8 | 0.09 | 0.02 | 1300 | 2 | 87.5 | 5617 | +6.8 |
| 5 | 16.6 | 16.7 | 66.7 | 0.1 | 0.1 | 1225 | 5 | 84.4 | 6825 | −5.3 |
| 6 | 16.6 | 16.7 | 66.7 | 0.1 | 0.15 | 1200 | 6 | 86.9 | 6949 | −4.7 |
| 7 | 16.6 | 16.7 | 66.7 | 0.12 | 0.18 | 1225 | 5 | 86.2 | 6115 | −3.3 |
| 8 | 6.5 | 19.8 | 73.7 | 0.14 | 0.21 | 1200 | 6 | 90.3 | 5337 | +1.5 |
| 9 | 16.6 | 16.7 | 66.7 | 0.15 | 0.3 | 1200 | 4 | 87.1 | 5575 | −5.1 |
| 10 | 16.6 | 10.7 | 72.7 | 0.16 | 0.26 | 1225 | 5 | 88.1 | 6112 | +3.8 |

(x + y + z = 100)

TABLE 8

| Sample No. | Chief ingredient (mol %) | | | | | | Sintering condition | | Dielectric ratio ($\epsilon$) | Quality factor $Q \times f$ | $\tau_f$ (ppm/°C.) |
|---|---|---|---|---|---|---|---|---|---|---|---|
| | x | y | z | α | γ | δ | °C. | Hour (h) | | | |
| 1  | 16.9 | 15.9 | 68.2 | 0.02 | 0.25 | 0 | 1350 | 3 | 91.2 | 7123 | +13.1 |
| 2  | 19.6 | 19.4 | 61.0 | 0.05 | 0.18 | 0 | 1450 | 2 | 90.1 | 6810 | −5.6 |
| 3  | 8.1  | 17.6 | 74.3 | 0.07 | 0.07 | 0 | 1250 | 2 | 87.4 | 5800 | +7.3 |
| 4  | 19.4 | 6.8  | 73.8 | 0.09 | 0.05 | 0 | 1300 | 4 | 89.5 | 5704 | +12.5 |
| 5  | 16.6 | 16.7 | 66.7 | 0.1  | 0.1  | 0 | 1350 | 2 | 90.4 | 7425 | −1.3 |
| 6  | 16.6 | 16.7 | 66.7 | 0.1  | 0.12 | 0 | 1375 | 2 | 91.5 | 7609 | −4.8 |
| 7  | 16.6 | 16.7 | 66.7 | 0.12 | 0.15 | 0 | 1350 | 2 | 89.6 | 6114 | −3.5 |
| 8  | 6.5  | 19.8 | 73.7 | 0.14 | 0.14 | 0 | 1225 | 4 | 92.2 | 4805 | +9.6 |
| 9  | 16.6 | 16.7 | 66.7 | 0.15 | 0.22 | 0 | 1350 | 2 | 91.7 | 5810 | +5.1 |
| 10 | 16.6 | 10.7 | 72.7 | 0.16 | 0.27 | 0 | 1300 | 2 | 91.4 | 6780 | +7.5 |
| 11 | 11.6 | 16.7 | 71.7 | 0.18 | 0.30 | 0 | 1250 | 3 | 93.7 | 5745 | +13.4 |
| 12 | 10.9 | 18.4 | 70.7 | 0.2  | 0.28 | 0 | 1275 | 4 | 94.4 | 5710 | +14.1 |

(x + y + z = 100)

TABLE 9

| Sample No. | Chief ingredient (mol %) | | | | | | Sintering condition | | Dielectric ratio ($\epsilon$) | Quality factor $Q \times f$ | $\tau_f$ (ppm/°C.) |
|---|---|---|---|---|---|---|---|---|---|---|---|
| | x | y | z | α | γ | δ | °C. | Hour (h) | | | |
| 1  | 16.9 | 15.9 | 68.2 | 0.02 | 0 | 0.21 | 1350 | 4 | 88.2 | 6214 | +12.6 |
| 2  | 19.6 | 19.4 | 61.0 | 0.05 | 0 | 0.14 | 1400 | 2 | 89.7 | 6310 | −7.2 |
| 3  | 8.1  | 17.6 | 74.3 | 0.07 | 0 | 0.03 | 1225 | 3 | 86.2 | 5107 | +9.7 |
| 4  | 19.4 | 6.8  | 73.8 | 0.09 | 0 | 0.17 | 1250 | 2 | 88.4 | 5516 | +11.7 |
| 5  | 16.6 | 16.7 | 66.7 | 0.1  | 0 | 0.04 | 1250 | 2 | 89.5 | 7218 | −2.8 |
| 6  | 16.6 | 16.7 | 66.7 | 0.1  | 0 | 0.10 | 1350 | 5 | 90.7 | 7321 | −4.6 |
| 7  | 16.6 | 16.7 | 66.7 | 0.12 | 0 | 0.13 | 1350 | 2 | 88.3 | 5798 | −4.8 |
| 8  | 6.5  | 19.8 | 73.7 | 0.14 | 0 | 0.27 | 1225 | 2 | 92.0 | 4206 | +5.8 |
| 9  | 16.6 | 16.7 | 66.7 | 0.15 | 0 | 0.30 | 1300 | 3 | 90.8 | 5318 | −1.4 |
| 10 | 16.6 | 10.7 | 72.7 | 0.16 | 0 | 0.17 | 1275 | 2 | 90.3 | 6519 | +6.6 |
| 11 | 11.6 | 16.7 | 71.7 | 0.18 | 0 | 0.05 | 1250 | 2 | 91.8 | 5211 | +12.9 |
| 12 | 10.9 | 18.4 | 70.7 | 0.2  | 0 | 0.15 | 1250 | 4 | 93.7 | 5215 | +13.8 |

(x + y + z = 100)

TABLE 10

| Sample No. | Chief ingredient (mol %) | | | | | | Sintering condition | | Dielectric ratio ($\epsilon$) | Quality factor $Q \times f$ | $\tau_f$ (ppm/°C.) |
|---|---|---|---|---|---|---|---|---|---|---|---|
| | x | y | z | α | γ | δ | °C. | Hour (h) | | | |
| 1  | 16.9 | 15.9 | 68.2 | 0.02 | 0.18 | 0.06 | 1350 | 4 | 90.7 | 6817 | +12.8 |
| 2  | 19.6 | 19.4 | 61.0 | 0.05 | 0.12 | 0.10 | 1450 | 2 | 90.3 | 6525 | −6.9 |
| 3  | 8.1  | 17.6 | 74.3 | 0.07 | 0.05 | 0.02 | 1250 | 3 | 86.8 | 5520 | +8.8 |
| 4  | 19.4 | 6.8  | 73.8 | 0.09 | 0.10 | 0.15 | 1300 | 2 | 89.7 | 5123 | +12.1 |
| 5  | 16.6 | 16.7 | 66.7 | 0.1  | 0.15 | 0.05 | 1325 | 2 | 90.2 | 7218 | −12. |
| 6  | 16.6 | 16.7 | 66.7 | 0.1  | 0.02 | 0.25 | 1350 | 4 | 90.8 | 7429 | −4.2 |
| 7  | 16.6 | 16.7 | 66.7 | 0.12 | 0.08 | 0.18 | 1350 | 2 | 92.1 | 4609 | −3.9 |
| 8  | 6.5  | 19.8 | 73.7 | 0.14 | 0.27 | 0.07 | 1225 | 2 | 92.1 | 4609 | +7.3 |
| 9  | 16.6 | 16.7 | 66.7 | 0.15 | 0.20 | 0.13 | 1350 | 3 | 91.1 | 5648 | +3.5 |
| 10 | 16.6 | 10.7 | 72.7 | 0.16 | 0.30 | 0.04 | 1300 | 2 | 91.0 | 6615 | +6.9 |
| 11 | 11.6 | 16.7 | 71.7 | 0.18 | 0.25 | 0.08 | 1250 | 2 | 92.1 | 5810 | +13.0 |
| 12 | 10.9 | 18.4 | 70.7 | 0.2  | 0.16 | 0.30 | 1275 | 4 | 93.6 | 5311 | +13.7 |

(x + y + z = 100)

What is claimed is:

1. A dielectric ceramic composition for microwave applications comprised of BaO, $Sm_2O_3$, $TiO_2$ and PbO or a compound of them, and having a following compositional formula:

$$x[(BaO)_{1-\alpha}(PbO)_\alpha]-ySm_2O_3-zTiO_2$$

wherein, 6 mol % $\leq x \leq$ 20 mol %, 6 mol % $\leq y \leq$ 20 mol %, 60 mol % $\leq z \leq$ 75 mol % and 0.01 mol % $\leq \alpha$ 0.2 mol %.

2. A dielectric ceramic composition for microwave applications according to claim 1, wherein $BaCO_3$ is substituted for BaO.

3. A dielectric ceramic composition for microwave applications according to claim 1, wherein $Pb_3O_4$ is substituted for PbO.

4. A dielectric ceramic composition for microwave applications characterized in that said dielectric ceramic composition includes BaO, $Sm_2O_3$, $TiO_2$ and PbO as chief ingredients and further includes SrO, $ZrO_2$, $MnO_2$, MgO, ZnO, $Bi_2O_3$, $La_2O_3$, $CeO_2$, or a compound of them as accessory ingredients to selectively add one or more of said accessory ingredients into said chief ingredients, and thereby provide a following compositional formula;

$$x[(BaO)_{1-\alpha-\beta}(PbO)_\alpha(MO)_\beta]-y[(Sm_2O_3)_{1-\gamma-\delta}(La_2O_3)_\gamma(CeO_2)_\delta]-zTiO_2$$

wherein, $(MO)_\beta$ is SrO, $ZrO_2$, $MnO_2$, MgO, ZnO or $Bi_2O_3$, 6 mol % $\leq x \leq$ 20 mol %, 6 mol % $\leq y \leq$ 20 mol %, 60 mol % $\leq z \leq$ 75 mol %, 0.01 mol % $\leq \alpha \leq$ 0.2 mol %, 0 mol % $\leq \beta \leq$ 0.3 mol %, 0 mol % $\leq \gamma \leq$ 0.3 mol %, 0 mol % $\leq \delta \leq$ 0.3 mol %, and x+y+z=100 mol %.

5. A dielectric ceramic composition for microwave applications according to claim 4, wherein $BaCO_3$ is substituted for BaO.

6. A dielectric ceramic composition for microwave applications according to claim 4, wherein $Pb_3O_4$ is substituted for of PbO.

7. A dielectric ceramic composition for microwave applications according to claim 4, wherein said $(MO)_\beta$ is selected from the group consisting of SrO, $ZrO_2$, $Mno_2$, MgO, ZnO and $Bi_2O_3$.

8. A dielectric ceramic composition for microwave applications consisting essentially of BaO, PbO, $Sm_2O_3$, and $TiO_2$, and having the following compositional formula:

$$x[(BaO)_{1-\alpha}(PbO)_\alpha]-ySm_2O_3-zTiO_2$$

wherein 6 mol % $\leq x \leq$ 20 mol %, 6 mol % $\leq y \leq$ 20 mol %, 60 mol % $\leq z \leq$ 75 mol %, and 0.01 mol % $\leq \alpha \leq$ 0.2 mol %.

9. A dielectric ceramic composition for microwave applications according to claim 8 wherein $BaCO_3$ is substituted for BaO.

10. A dielectric ceramic composition for microwave applications according to claim 8 wherein $Pb_3O_4$ is substituted for PbO.

* * * * *